United States Patent [19]

Rabenecker

[11] 4,309,375

[45] Jan. 5, 1982

[54] METHOD AND APPARATUS FOR CONTINUOUS PRODUCTION OF REINFORCED PROFILE BELTS

[75] Inventor: Klaus Rabenecker, Nordenham, Fed. Rep. of Germany

[73] Assignee: Norddeutsche Seekabelwerke Aktiengesellschaft, Nordenham, Fed. Rep. of Germany

[21] Appl. No.: 159,099

[22] Filed: Jun. 13, 1980

[30] Foreign Application Priority Data

Jun. 16, 1979 [DE] Fed. Rep. of Germany ....... 2924357

[51] Int. Cl.³ .......................... B29D 29/00; B29H 7/22
[52] U.S. Cl. ..................................... 264/167; 264/171; 264/174; 425/34 B; 425/115; 425/327; 425/329; 425/337; 425/371; 425/394
[58] Field of Search ............... 264/171, 174, 236, 347, 264/175, 134–136, 166, 167; 425/115, 327, 336, 337, 371, 373, 329, 186, 34 B, 394

[56] References Cited

U.S. PATENT DOCUMENTS

| | | | |
|---|---|---|---|
| 3,278,667 | 10/1966 | Knox | 264/171 |
| 3,513,231 | 5/1970 | Bair et al. | 264/171 |
| 3,852,387 | 12/1974 | Bortnick et al. | 425/371 |
| 3,880,558 | 4/1975 | Breher et al. | 425/373 |
| 3,999,914 | 12/1976 | Breher et al. | 425/115 |
| 4,058,424 | 11/1977 | Breher et al. | 425/115 |
| 4,128,369 | 12/1978 | Kemerer et al. | 425/371 |

FOREIGN PATENT DOCUMENTS

2123902 11/1972 Fed. Rep. of Germany .

Primary Examiner—Jeffery R. Thurlow
Attorney, Agent, or Firm—Sughrue, Mion, Zinn, Macpeak and Seas

[57] ABSTRACT

A method and apparatus for continuously producing reinforced profile belts of extruded material provided with a stretch resistant insert strip 6, wherein the extruded material stream 3 passes between two circulating endless loop halves 1, 2 of a divided former which converge along a portion of their lengths to form a closed former or pressure molding segment or run. The former segment is straight and the insert strip coated by the extruded material is pulled through it under tension. The insert strip inside the finished and hardened belt is encased on all sides and lies in the belt's central or neutral zone after leaving the apparatus.

8 Claims, 2 Drawing Figures

4,309,375

METHOD AND APPARATUS FOR CONTINUOUS PRODUCTION OF REINFORCED PROFILE BELTS

BACKGROUND OF THE INVENTION

This invention relates to a method and apparatus for the continuous production of reinforced profile belts from extrudable material provided with a stretch resistant insert. The extruded material stream passes between the two circulating halves of a divided former. The former halves are endless loops which converge along a portion of their lengths to form a closed former segment.

It is essential with profile belts, particularly toothed belts subjected to high performance demands, that an inner seal be formed between the material comprising the body of the belt and a strengthening insert strip. The tractive force is thereby transferred from the teeth to the insert strip without causing the strip to shift inside the belt. It is also important that the reinforcement or insert strip be firmly secured in the neutral zone of the belt and that the insert be completely surrounded by the synthetic material comprising the body of the belt.

Known methods of producing profile belts have not always met these desired criteria. German OS 21 23 902 teaches a method for the continuous production of reinforced profile belts from extruded material with a stretch resistant insert strip. The two endless circulating halves of a divided former converge along a portion of their lengths. The nozzle of an extruder forms a seal where it fits between, and opens into the closed former halves. The length and rotational speed of the closed former and the extrusion rate of the extruder are calculated so that the former cavities at the end of the closed former segment are sealed by the solidified material. A back pressure is produced which compensates the volume for shrinkage until the material hardens. The fact that the closed former segment with the cavities is formed by an endless belt wrapped around a turning wheel, thus giving it a circular arch shape, and the manner in which the synthetic material is injected into the former cavities and the stretch resistant insert strip is introduced, prevent this method from completely satisfying the criteria set out above. In particular, it is impossible to completely surround the insert strip with synthetic material. This is evident in FIG. 6 and from the second paragraph on page 10 to the first paragraph on page 11 of the specification of German OS 21 23 902, since the drivers 19 leave blank places on the reinforcement or insert strip 17.

In the embodiment according to FIG. 3 of this German OS (also see page 10 there, the last three lines) it appears that synthetic material 21 is placed on the comb surfaces 14 through the auxiliary nozzles. There the material hardens by appropriate temperature treatment of the former wheel (compare page 11 of the mentioned German OS, fourth line). However, in practice unexpected difficulties arise. Thus, it is unavoidable that the hot reinforcement 17 pushes its way through the newly hardened, thin layer of plastic and directly touches the comb surfaces 14 of the teeth, which results in undesirable blank places. Further, the insert strip no longer lies in the neutral zone.

SUMMARY OF THE INVENTION

The object of this invention is thus to provide a method and apparatus of the type mentioned above which is free of the disadvantages which one has had to accept until now.

In the continuous production method and apparatus of this invention, the closed former segment is straight and even, and the insert strip is pulled through the segment under tension. The strip is encased by the extruded plastic material before it enters the closed former section. The insert strip is thus completely enclosed inside the finished and hardened profile belt after leaving the closed former, and is desirably positioned in the neutral zone of the belt. Accordingly, this invention has the advantage of securely anchoring the reinforcement or insert strip in the neutral zone, and completely encasing the reinforcement with synthetic material without any blank places.

A further object of this invention is to provide a method and apparatus for the continuous production of reinforced profile belts from an extruded material provided with a stretch resistant insert strip, in which the extruded material stream is fed into two circular, endless halves of a divided former which form a closed segment where they converge along a section of their lengths. After entering the closed segment and up to the point where it hardens therein, the extruded material stream is gradually reduced in volume by reducing the former cavity to compensate for shrinkage. The shrinkage compensation achieved in this manner is far more effective than that in the referenced German OS 21 23 902. In the latter the plastic stream must be fed directly into the closed segment of the former by a press piece 13. Such a form fitting closed segment is difficult to produce and is therefore expensive. In addition, shrinkage compensation in the known method is accomplished by additional material pressure from the extruder. In the present invention shrinkage compensation is implemented very simply with the aid of conical guide surfaces and guide tracks, which reduce the volume without the burdensome necessity of synchronizing the extrusion speed of the extruder with the length and the speed of the closed former segments.

DETAILED DESCRIPTION OF THE PREFERRED EMBODIMENT

Figure 1:
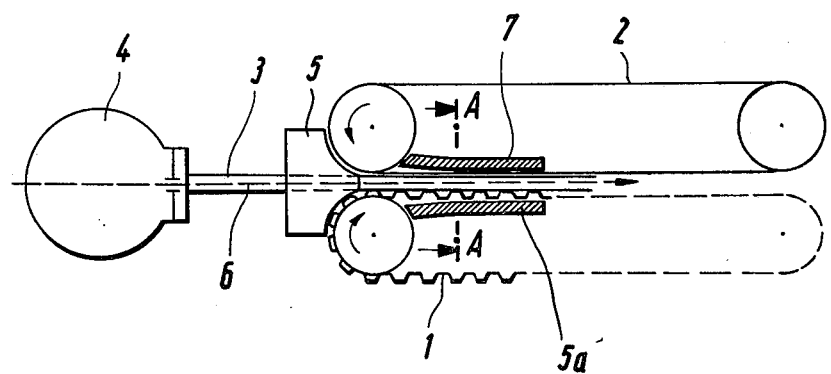
FIG. 1 shows a longitudinal section through an apparatus according to this invention.
Figure 2:
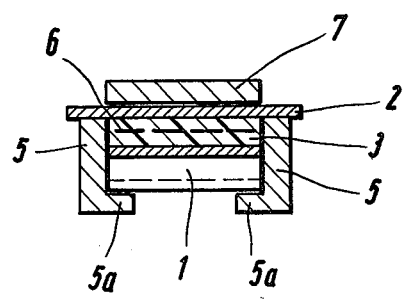
FIG. 2 shows a section taken along line A—A in FIG. 1.

In this invention an elastic stream of rubber or plastic material 3 flows freely out of an extrusion head 4. A layered, stretch resistant, and belt-shaped reinforcement or insert strip 6 also runs through the extrusion head and is enclosed therein on all sides by the plastic or rubber. The belt-shaped, encased structure thus formed enters an inlet funnel 5 after leaving the extrusion head. The funnel 5 closely abuts the forming area, made up of a lower, circulating creeper band 1 and an upper circulating smooth metal or textile band 2.

Both bands are endless and without segments, and both can have irregular profiles corresponding to the desired surface configuration of the belt, or one of the two can be smooth as in the illustrated embodiment.

Guide surface 7 and guide tracks 5a converge conically in the direction of movement through the closed former segment, and compensate for shrinkage caused by the volume lost as the material stream cools. The guide tracks 5a are integral with the inlet funnel 5. The guide surface 7 is rigidly attached to the frame of the machine independent of the inlet funnel 5 above the lower drum of the upper former half.

The method and apparatus taught in the invention can be used to safely and simply produce reinforced profile belts with an insert encased on all sides. The shrinkage accommodation necessary in the production of the belts can also be more simply achieved than with prior known methods and apparatuses.

What is claimed is:

1. A method for continuously producing reinforced profile belts of extruded rubber or plastic material provided with a stretch resistant insert strip, wherein an extruded rubber or plastic material stream passes between two circulating endless loop halves of a divided former which converge along a portion of their lengths to define a closed former segment, comprising the steps of:
   (a) drawing the insert strip centrally through an extruder outlet to encase it on all sides with a coating of rubber or plastic material, and
   (b) pulling the coated strip through a straight, closed former segment under tension allowing the coated strip to cool to centrally dispose the strip in a neutral zone of the finished belt and cover the strip on all sides by the rubber or plastic material.

2. A method as defined in claim 1, further comprising gradually reducing the cross-sectional area of the plastic or rubber coating material as the strip passes through the closed former segment to compensate for shrinkage during hardening.

3. An apparatus for producing toothed belts having a stretch resistant reinforcing insert strip encased in an extrudable elastic material such as rubber or plastic, comprising:
   (a) an extruder having an outlet nozzle through which an insert strip may be drawn to encase it in elastic material, and
   (b) a former disposed downstream of the extruder and including:
      (1) a pair of endless driven bands each supported around opposing spaced rollers and defining a straight, elongated mold chamber between two adjacent runs of said bands, one of said bands having a toothed outer surface,
      (2) an inlet funnel disposed at a nip zone between two of said rollers for feeding the encased insert strip into the former, and
      (3) a pair of converging guide means disposed behind and in engagement with said two adjacent band runs for decreasing the cross-sectional area of the mold chamber in a downstream direction to compensate for shrinkage as the elastic material cools during its passage through the chamber.

4. An apparatus as defined in claim 3, wherein one of said guide means comprises a pair of flange tracks integral with and extending inwardly from opposite side walls of said funnel.

5. A method as defined in claim 2, wherein the cross-sectional area of the plastic or rubber coating material is gradually reduced by gradually reducing the cross-sectional area of the closed former segment by guiding the two circulating endless loop halves by a pair of flange tracks which are integral with and extend endwardly from opposite sides of an inlet funnel of the closed former segment and by a guide surface located above and spaced apart from the pair of flange tracks, the spacing between the flange tracks and guide surface gradually diminishing in order to decrease the cross-sectional area of the closed former segment in a downstream direction.

6. An apparatus as defined in claim 4, wherein the other guide means comprises a flat guide surface spaced apart from and located above the pair of flange tracks, the spacing between the flange tracks and the guide surface gradually diminishing in the downstream direction.

7. A guide for a divided former having upper and lower endless driven bands each supported around opposing spaced rollers and defining a straight, elongated mold chamber between two adjacent runs of the bands, comprising a pair of flange tracks integral with and extending inwardly from opposite side walls of an inlet funnel of the mold chamber for guiding one of the bands, and a guide surface spaced apart from and located above the flange tracks for guiding the other band.

8. A guide as defined in claim 7 wherein the spacing between the flange tracks and the guide surface gradually diminishes in a downstream direction of the mold chamber.

* * * * *